(12) United States Patent
Hirashita et al.

(10) Patent No.: US 11,441,674 B2
(45) Date of Patent: Sep. 13, 2022

(54) VEHICLE SHIFT DEVICE

(71) Applicant: KABUSHIKI KAISHA TOKAI-RIKA-DENKI-SEISAKUSHO, Aichi (JP)

(72) Inventors: Takahiro Hirashita, Aichi (JP); Hiroki Ono, Aichi (JP); Masaaki Shiozaki, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 16/765,446

(22) PCT Filed: Nov. 16, 2018

(86) PCT No.: PCT/JP2018/042553
§ 371 (c)(1),
(2) Date: May 19, 2020

(87) PCT Pub. No.: WO2019/111677
PCT Pub. Date: Jun. 13, 2019

(65) Prior Publication Data
US 2020/0318733 A1 Oct. 8, 2020

(30) Foreign Application Priority Data
Dec. 4, 2017 (JP) .............................. JP2017-232810

(51) Int. Cl.
*F16H 59/08* (2006.01)
*F16H 61/24* (2006.01)

(52) U.S. Cl.
CPC ............ *F16H 61/24* (2013.01); *F16H 59/08* (2013.01); *F16H 2061/243* (2013.01)

(58) Field of Classification Search
CPC .... F16H 61/24; F16H 59/08; F16H 2061/243; F16H 61/22; F16H 2059/0282; F16H 2061/223
See application file for complete search history.

(56) References Cited

U.S. PATENT DOCUMENTS 9,254,745 B2 * 2/2016 Tokumo ................. B60K 20/08
9,334,952 B2 * 5/2016 Tokumo ................. F16H 59/08
(Continued)

FOREIGN PATENT DOCUMENTS

DE 102012210810 A1 * 1/2014 ............ B60K 20/02
JP 2006-044565 A 2/2006
(Continued)

*Primary Examiner* — Jake Cook
*Assistant Examiner* — Gregory Robert Weber
(74) *Attorney, Agent, or Firm* — Roberts Calderon Safran & Cole P.C.

(57) ABSTRACT

A strength of an outer side portion in a second direction of a shift body is increased. In a shift device, when a lever is placed in an 'M' position, a right avoidance hole of the lever avoids interference with a right restricting portion, rotational movement of a left restricting surface of the lever is restricted by a left restricting portion, and an operation to rotationally move the lever towards the right side is restricted. Furthermore, when the lever is placed in a 'D' position, a left avoidance hole of the lever avoids interference with the left restricting portion, rotational movement of a right restricting surface of the lever is restricted by the right restricting portion, and an operation to rotationally move the lever towards the left side is restricted. The right avoidance hole and the left avoidance hole can be made smaller, so that the strength of both outer side portions in a lateral directions of the lever can be increased.

5 Claims, 8 Drawing Sheets

(56) References Cited

U.S. PATENT DOCUMENTS

| | | | |
|---|---|---|---|
| 10,077,836 B2* | 9/2018 | Tomita | F16H 61/22 |
| 10,184,557 B2* | 1/2019 | Kato | B60K 20/02 |
| 2013/0025398 A1* | 1/2013 | Choi | F16H 59/0217 |
| | | | 74/473.12 |
| 2015/0101439 A1* | 4/2015 | Lee | F16H 59/0204 |
| | | | 74/473.33 |
| 2018/0094719 A1* | 4/2018 | Hill | F16H 59/0204 |

FOREIGN PATENT DOCUMENTS

| | | |
|---|---|---|
| JP | 2010-166929 A | 8/2010 |
| JP | 2011-219002 A | 11/2011 |
| JP | 2013-103699 A | 5/2013 |

* cited by examiner

VEHICLE SHIFT DEVICE

CROSS-REFERENCE TO RELATED APPLICATIONS

The present application is a U.S. National Phase of PCT/JP2018/042553 filed on Nov. 16, 2018, claiming priority under 35 USC 119 from Japanese Patent Application No. 2017-232810 filed Dec. 4, 2017, the disclosure of which is incorporated by reference herein.

TECHNICAL FIELD

The present disclosure relates to a vehicle shift device in which a shift position of a shift body is changed as a result of the shift body being moved in a first direction and a second direction.

BACKGROUND ART

In a shift lever device described in Japanese Patent Application Laid-open (JP-A) No. 2013-103699, as a result of movement of an engaging portion of a shift lever being restricted by a partitioning plate, movement in a Select direction between a D position and a − position of the shift lever, and movement in a Select direction between an R position and a + position of the shift lever are restricted.

Here, in this shift lever device, an inner side surface in the Select direction of the engaging portion of the shift lever interferes with the partitioning plate, and as a result of this, the movement in the Select direction between the D position and the − position of the shift lever, and the movement in the Select direction between the R position and the + position of the shift lever are restricted.

SUMMARY OF THE INVENTION

Technical Problem

The present disclosure was conceived in view of the above-described circumstances and it is an object thereof to provide a shift device that enables the strength of an outer side portion in a second direction of a shift body to be increased.

Solution to the Problem

A vehicle shift device of a first aspect of the present disclosure includes a shift body configured to be moved in a first direction and in a second direction such that a shift position of the sift body is altered, the shift body is movable to each of a pair of movement positions that are aligned in the first direction and not aligned in the second direction, and a pair of restricting portions that restrict movement of the shift body toward either sides in the second direction between the pair of movement positions by restricting movement of outer side surfaces of the shift body in the second direction.

A shift device of second aspect of the present disclosure is, in the shift device of the first aspect of the present disclosure, further includes a displacement restricting portion that, in a state in which the shift body is disposed at either one of the movement positions, restricts displacement of the shift body in a perpendicular direction relative to a movement direction of the shift body.

A shift device of third aspect of the present disclosure, in the shift device of the first aspect or second aspect of the present disclosure, further includes an outer restricting portion that restricts movement of the shift body beyond a range of movement of the shift body.

Advantageous Effects of the Invention

In the shift device of the first aspect of the present disclosure, the shift body is moved in a first direction and in a second direction such that a shift position of the shift body is altered. In addition, the shift body is movable to each of a pair of movement positions that are aligned each other in the first direction but are not aligned in the second direction.

A pair of restricting portions restrict movement of outer side surfaces in the second direction of the shift body, so that movement towards either sides in the second direction between the pair of movement positions of the shift body is restricted. Because of this, when one restricting portion restricts movement of an outer side surface of the shift body in the second direction, it is sufficient if the shift body is able to avoid the other restricting portion, so that a restricting portion avoidance portion of the shift body can be made smaller, and the strength of the outer side portion in the second direction of the shift body can be increased.

In the shift device of the second aspect of the present disclosure, in a state in which the shift body is disposed at either one of the movement positions, a displacement restricting portion restricts displacement of the shift body in a perpendicular direction relative to a movement direction of the shift body. Because of this, it is possible to increase the accuracy when placing the shift body at either one of the movement positions.

In the shift device of the third aspect of the present disclosure, an outer restricting portion restricts movement of the shift body beyond a range of movement of the shift body. Because of this, movement beyond a range of movement of the shift body can be restricted.

DESCRIPTION OF THE EMBODIMENTS

Figure 2A:
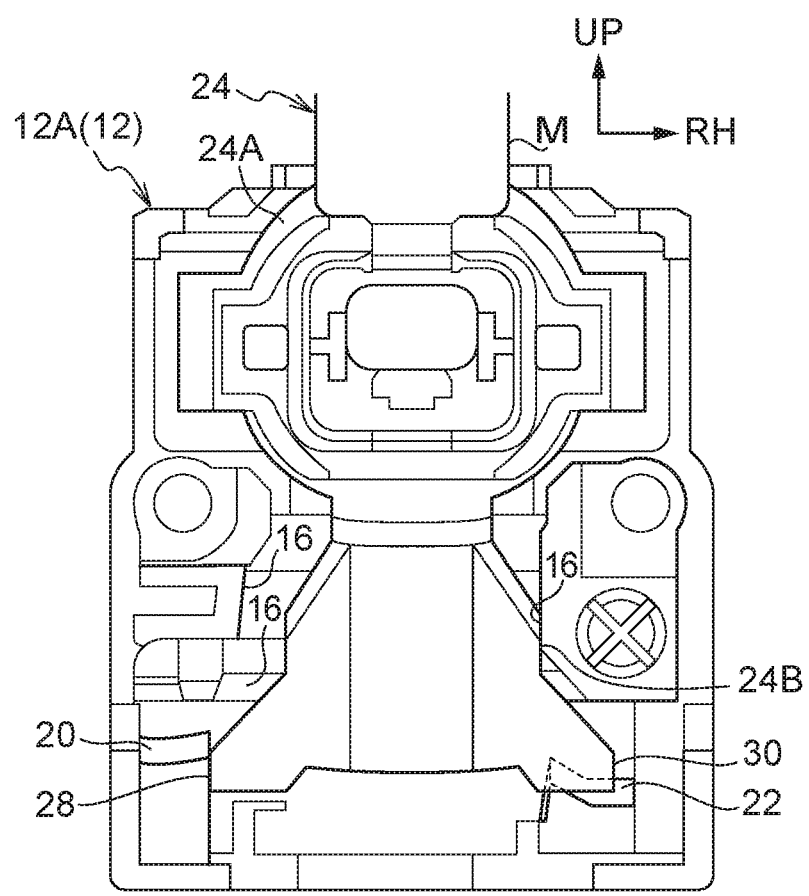
FIG. 2A is a rear surface view showing principal portions of the shift device according to an exemplary embodiment of the present invention, and shows a state when the lever is placed in an 'M' position.

Principal portions of a shift device 10 according to an exemplary embodiment of the present invention are shown in a rear surface view as seen from a rear in FIG. 2A. Note that, in the drawings, a front side, a right side, and an upper side of the shift device 10 are shown respectively by an arrow FR, an arrow RH, and an arrow UP.

The shift device 10 according to the present exemplary embodiment is a floor shift device, and is installed at a central portion in a vehicle width direction of a floor portion (i.e., on a vehicle body side thereof) of a vehicle cabin of a right-hand drive vehicle. A front side, left side and upper side of the shift device 10 face towards the front side, the left side, and the upper side respectively of the vehicle.

Figure 1A:
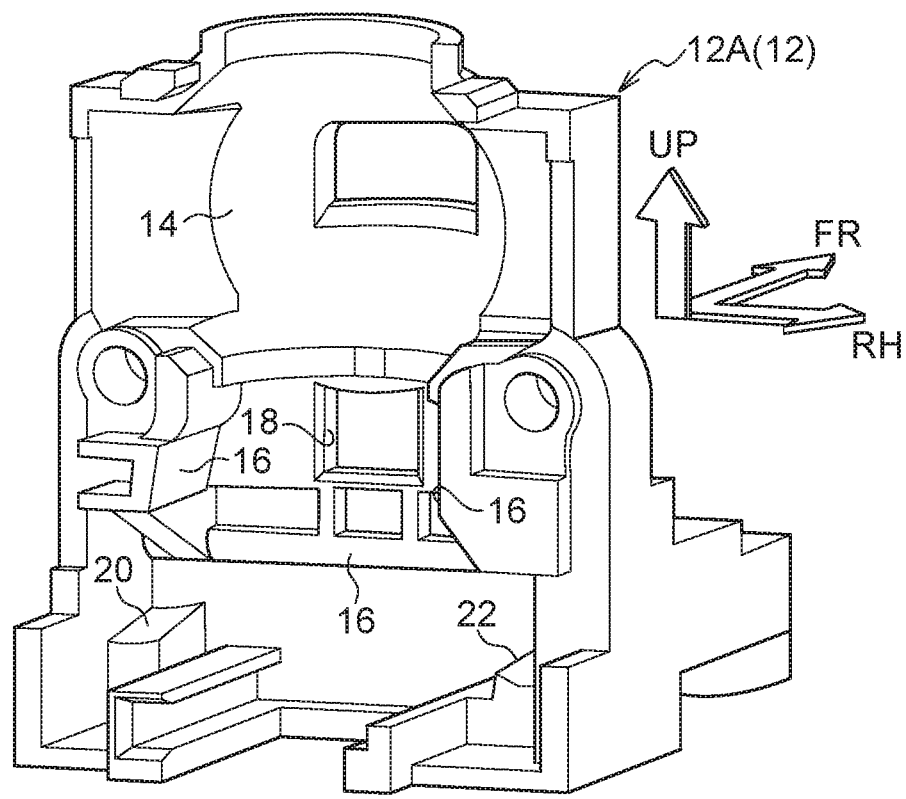
FIG. 1A is a perspective view as seen diagonally from the rear and a right side showing a front plate of a shift device according to an exemplary embodiment of the present invention.

As is shown in FIG. 2A, a substantially rectangular-box shaped plate 12 (i.e., a housing, see FIG. 1A) that is made of resin and serves as a housing body and a supporting body is provided in the shift device 10. The plate 12 is installed on (i.e., fixed to) the floor portion of the vehicle cabin. The plate 12 is formed by a front plate 12A and a rear plate (not shown in the drawings), and the front plate 12A and the rear plate are joined to each other in the front-rear direction.

A spherical bearing surface 14 which serves as a supporting portion is formed at an upper portion of an interior of the plate 12. The bearing surface 14 is divided so as to be provided at both the front plate 12A and the rear plate, and an interior thereof is open at an upper side and a lower side of the bearing surface 14.

A substantially rectangular-frame shaped restricting frame 16 (see FIG. 5A through FIG. 5E) which serves as an outer restricting portion is formed at a central portion in a vertical direction of the interior of the plate 12. The restricting frame 16 is divided so as to be provided at both the front plate 12A and the rear plate, and an interior thereof is open at an upper side and a lower side of the restricting frame 16. A substantially rectangular-column shaped protruding portion 16A is formed at an angle portion between a right side and a rear side of an interior of the restricting frame 16, and this protruding portion 16A protrudes into the interior of the restricting frame 16.

A substantially rectangular restricting hole 18 which serves as a displacement restricting portion is formed at a central portion in the lateral direction of a region between the bearing surface 14 and the restricting frame 16 at a front wall inner surface of the plate 12 (i.e., of the front plate 12A). The restricting hole 18 is open at a rear side thereof. An upper surface of the restricting hole 18 is disposed so as to be substantially parallel with the front-rear direction, and is curved in a circular arc shape having a center thereof coinciding with a center of curvature of the bearing surface 14.

A left restricting portion 20 and a right restricting portion 22 which are each formed in a substantially rectangular-column shape and serve as restricting portions are formed at a left end-portion and a right end-portion at a front-side and lower-side end portion of the interior of the plate 12 (i.e. of the front plate 12A). The left restricting portion 20 is formed integrally with a left wall, a front wall, and a lower wall of the plate 12, while the right restricting portion 22 is formed integrally with a right wall, the front wall, and the lower wall of the plate 12. A rear surface of the left restricting portion 20 and a rear surface of the right restricting portion 22 are disposed so as to be perpendicular to the front-rear direction, and are disposed at a same position each other in the front-rear direction. Dimensions in the vertical direction of the left restricting portion 20 are larger than dimensions in the vertical direction of the right restricting portion 22, and an upper surface of the left restricting portion 20 and an upper surface of the right restricting portion 22 are both inclined so as to slope towards an upper side the closer they are to the front side. An upper-surface left-side portion of the left restricting portion 20 is disposed so as to be substantially horizontal relative to the front-rear direction and the lateral direction, while an upper-surface right-side portion of the left restricting portion 20 is inclined so as to slope towards the upper side the closer it is to the right side. A right surface of the left restricting portion 20 is disposed so as to be perpendicular to the lateral direction. An upper-surface right-side portion of the right restricting portion 22 is disposed so as to be substantially horizontal relative to the front-rear direction and the lateral direction, while an upper-surface left-side portion of the right restricting portion 22 is inclined so as to slope towards an upper side the closer it is to the left side. A left surface of the right restricting portion 22 is inclined so as to slope towards the right side the closer it is to the upper side.

Figure 1B:
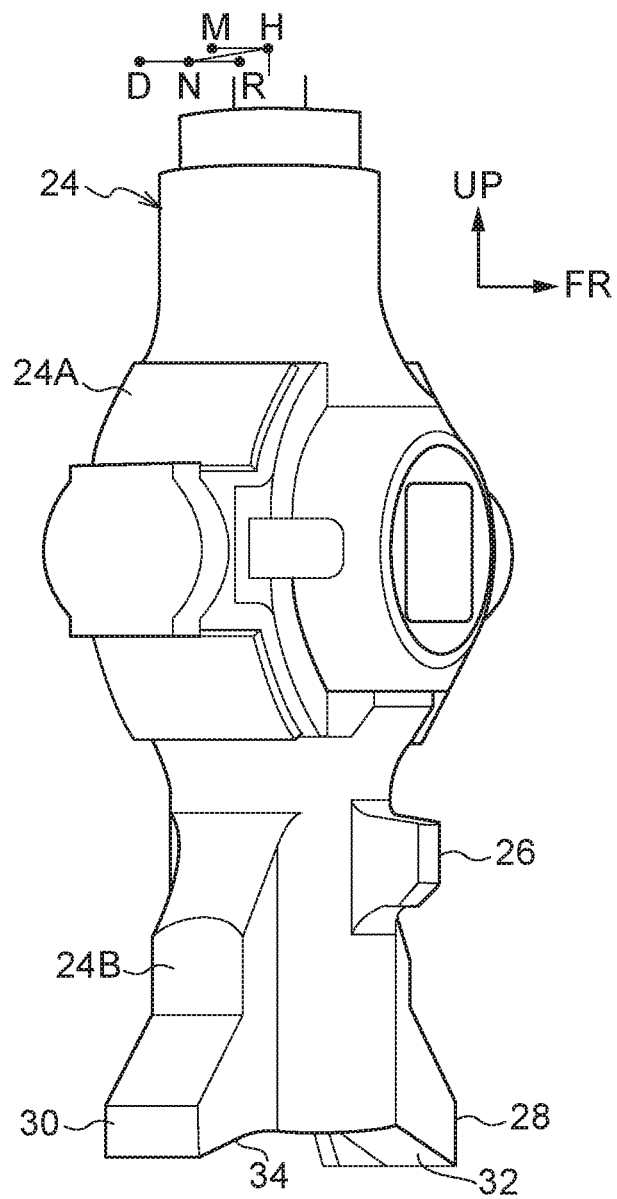
FIG. 1B is a perspective view as seen diagonally from the front and a right side showing a lever of the shift device according to an exemplary embodiment of the present invention.

An elongated, substantially column shaped lever 24 (see FIG. 1B) which serves as a shift body and is made from resin is housed within the plate 12, and this lever 24 is formed having a symmetrical shape with respect to a central surface thereof that is perpendicular to the lateral direction and that is disposed at a center in the lateral direction of the lever 24. A substantially sphere shaped spherical shaft 24A which serves as a supported portion is provided integrally with a central portion in the vertical direction of the lever 24. When the outer circumferential surface of the spherical shaft 24A is engaged with the bearing surface 14 of the plate 12, the spherical shaft 24A is supported so as to be rotatable inside the bearing surface 14. Because of this, the lever 24 is able to move rotationally in the front-rear direction (i.e., a Shift direction, a first direction) and a lateral direction (i.e., a Select direction, a second direction) around the spherical shaft 24A (i.e., around the center of curvature of the outer circumferential surface of the spherical shaft 24A and around the center of curvature of the bearing surface 14).

An upper side portion of the lever 24 extends to the upper side of the plate 12, and the lever 24 is formed such that an occupant of the vehicle (for example, the driver) is able to perform a rotation operation on the lever 24 via an upper end portion thereof. The lever 24 is placed in an 'H' position (i.e., a home position) which serves as a predetermined shift position, and is operated rotationally from the 'H' position towards a rear side so as to be disposed in an 'M' position (i.e., a manual position) which serves as a move position. In addition, the lever 24 is operated rotationally from the 'H' position towards a right side so as to be disposed in an 'N' position (i.e., a neutral position) which also serves as a shift position. Furthermore, the lever 24 is operated rotationally from the 'N' position towards a front side so as to be disposed in an 'R' position (i.e., a reverse position) which also serves as a shift position. In addition, the lever 24 is operated rotationally from the 'N' position towards the rear side so as to be disposed in a 'D' position (i.e., a drive position) which serves as a move position. The 'M' position and the 'D' position are at the same locations each other in the front-rear direction, but are mutually different from each other in the lateral direction.

A lower portion 24B of the lever 24 is formed substantially in a rectangular column shape, and is inserted through the inside of the restricting frame 16 of the plate 12. The lower portion 24B of the lever 24 is able to move rotationally within the restricting frame 16 (see FIG. 5A through FIG. 5E).

A substantially rectangular column shaped restricting projection 26 which serves as a displacement restricted portion is formed between the spherical shaft 24A and the lower portion 24B at the front end of the lever 24. The restricting projection 26 protrudes towards the front and is inserted into the restricting hole 18 of the plate 12. An upper-surface of the restricting projection 26 is inclined so as to slope towards a lower side the closer it is to the front side, and is also curved in a concave shape in the lateral direction. When the lever 24 is operated rotationally towards the rear side so as to be disposed in the 'M' position or the 'D' position, the restricting projection 26 is moved towards the front side. As a result, the upper surface of the restricting projection 26 is disposed over the upper surface of the restricting hole 18 with the upper surface of the restricting projection 26 being separated slightly from the upper surface of the restricting hole 18 (see FIG. 3, FIG. 4A, and FIG. 4B).

A rectangular left restricting surface 28 and a rectangular right restricting surface 30 which serve respectively as restricted portions (i.e., outer side surfaces) are formed on a left surface and a right surface respectively of a lower end portion of the lever 24. The left restricting surface 28 and the right restricting surface 30 are disposed so as to be perpendicular relative to the lateral direction. A triangular-column shaped left avoidance hole 32 and right avoidance hole 34 which serve respectively as avoidance portions are formed at a left end-portion and a right end-portion of the lower end portion of the lever 24. The left avoidance hole 32 is open on the front side, the lower side, and the right side, while the right avoidance hole 34 is open on the front side, the lower side, and the left side.

Next, operations of the present exemplary embodiment will be described.

In the shift device 10 having the above-described structure, when the shift lever 24 is being placed at the 'H' position (see FIG. 5A), rotational movement of the lower portion 24B of the lever 24 towards the right side is restricted by the right surface of the interior of the restricting frame 16 of the plate 12, so that an operation to move the lever 24 rotationally towards the left side is restricted. Furthermore, rotational movement of the lower portion 24B of the lever 24 towards the rear side is restricted by the front surface of the protruding portion 16A of the plate 12, so that an operation to move the lever 24 rotationally towards the front side is restricted.

When the lever 24 is operated rotationally in the front-rear direction between the 'H' position and the 'M' position, (see FIG. 2A, FIG. 5A, and FIG. 5B), rotational movement of the lower portion 24B of the lever 24 towards the right side is restricted by the right surface of the interior of the restricting frame 16 of the plate 12, so that an operation to rotationally move the lever 24 towards the left side is restricted. In addition, when the right restricting portion 22 of the plate 12 is inserted into the right avoidance hole 34 of the lever 24, rotational movement of the left restricting surface 28 towards the left side is restricted by the right surface of the left restricting portion 20 of the plate 12, so that an operation to rotationally move the lever 24 towards the right side is restricted.

When the lever 24 is disposed at the 'M' position, (see FIG. 2A and FIG. 5B), rotational movement of the lower portion 24B of the lever 24 towards the right side is restricted by the right surface of the interior of the restricting frame 16, so that an operation to rotationally move the lever 24 towards the left side is restricted. In addition, when the right restricting portion 22 of the plate 12 is inserted into the right avoidance hole 34 of the lever 24, rotational movement of the left restricting surface 28 of the lever 24 towards the left side is restricted by the right surface of the left restricting portion 20, so that an operation to rotationally move the lever 24 towards the right side is restricted. Furthermore, rotational movement of the lower portion 24B towards the front side is restricted by the front surface of the interior of the restricting frame 16, so that an operation to rotationally move the lever 24 towards the rear side is restricted.

When the lever 24 is rotationally operated in the lateral direction between the 'H' position and the 'N' position, (see FIG. 5A and FIG. 5C), rotational movement of the lower end portion of the lever 24 towards the front side is restricted by the rear surface of the left restricting portion 20 and the rear surface of the right restricting portion 22, so that an operation to rotationally move the lever 24 towards the rear side is restricted. In addition, rotational movement of the lower portion 24B towards the rear side is restricted by the front surface of the protruding portion 16A of the plate 12, so that an operation to rotationally move the lever 24 towards the front side is restricted.

When the lever 24 is disposed at the 'N' position, (see FIG. 5C), rotational movement of the lower portion 24B of the lever 24 towards the left side is restricted by the left surface of the interior of the restricting frame 16, so that an operation to rotationally move the lever 24 towards the right side is restricted.

When the lever 24 is operated in a rotational movement in the front-rear direction between the 'N' position and the 'R' position, (see FIG. 5C and FIG. 5D), rotational movement of the lower portion 24B towards the left side is restricted by the left surface of the interior of the restricting frame 16, so that an operation to rotationally move the lever 24 towards the right side is restricted. In addition, rotational movement of the lower portion 24B towards the right side is restricted by the left surface of the protruding portion 16A of the plate 12, so that an operation to rotationally move the lever 24 towards the left side is restricted.

Figure 2B:
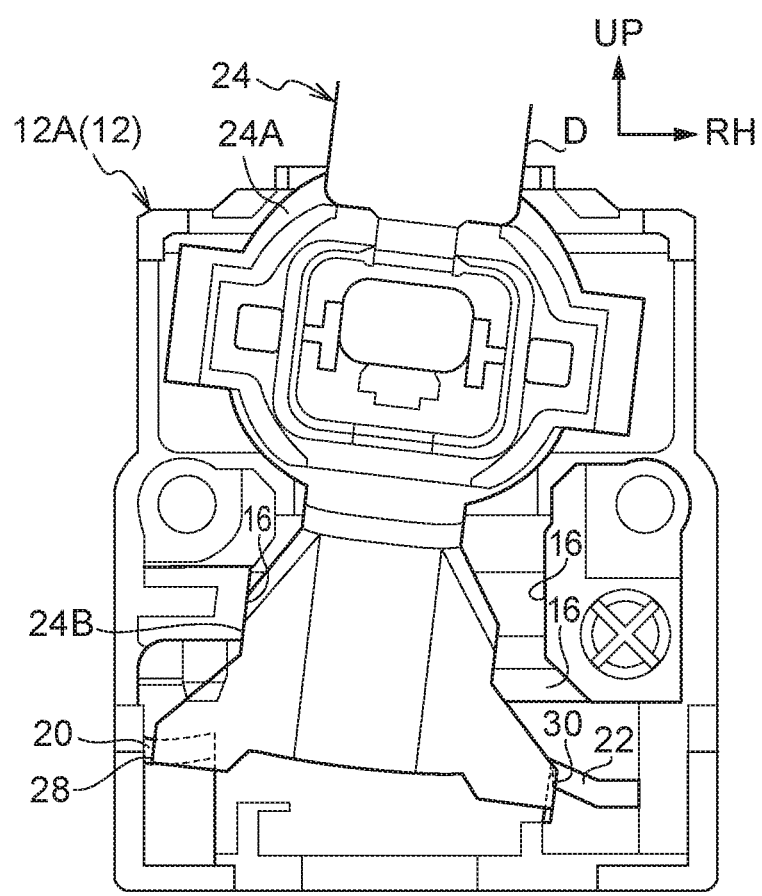
FIG. 2B is a rear surface view showing principal portions of the shift device according to an exemplary embodiment of the present invention, and shows a state when the lever is placed in a 'D' position.

When the lever 24 is disposed at the 'R' position, (see FIG. 2B and FIG. 5D), rotational movement of the lower portion 24B towards the left side is restricted by the left surface of the interior of the restricting frame 16 of the plate 12, so that an operation to rotationally move the lever 24 towards the right side is restricted. In addition, rotational movement of the lower portion 24B towards the right side is restricted by the left surface of the protruding portion 16A of the plate 12, so that an operation to rotationally move the lever 24 towards the left side is restricted. Furthermore, rotational movement of the lower portion 24B towards the rear side is restricted by the rear surface of the interior of the restricting frame 16 of the plate 12, so that an operation to rotationally move the lever 24 towards the front side is restricted.

When the lever 24 is rotationally operated in the front-rear direction between the 'N' position and the 'D' position, (see FIG. 2B, FIG. 5C, and FIG. 5E), rotational movement of the lower portion 24B of the lever 24 towards the left side is restricted by the left surface of the interior of the restricting frame 16 of the plate 12, so that an operation to rotationally move the lever 24 towards the right side is restricted. In addition, when the left restricting portion 20 of the plate 12 is inserted into the left avoidance hole 32 of the lever 24, rotational movement of the right restricting surface 30 of the lever 24 towards the right side is restricted by the left surface of the right restricting portion 22 of the plate 12, so that an operation to rotationally move the lever 24 towards the left side is restricted.

When the lever 24 is disposed at the 'D' position, (see FIG. 2B and FIG. 5E), rotational movement of the lower portion 24B of the lever 24 towards the left side is restricted by the left surface of the interior of the restricting frame 16 of the plate 12, so that an operation to rotationally move the lever 24 towards the right side is restricted. In addition, when the left restricting portion 20 of the plate 12 is inserted into the left avoidance hole 32 of the lever 24, rotational movement of the right restricting surface 30 of the lever 24 towards the right side is restricted by the left surface of the right restricting portion 22, so that an operation to rotationally move the lever 24 towards the left side is restricted. Furthermore, rotational movement of the lower portion 24B towards the front side is restricted by the front surface of the interior of the restricting frame 16 of the plate 12, so that an operation to rotationally move the lever 24 towards the rear side is restricted.

When the lever 24 is disposed at the 'D' position, rotational movement of the left restricting surface 28, which is an outer side surface in the lateral direction of the lever 24, towards the left side is restricted by the right surface of the left restricting portion 20 of the plate 12, and an operation to move the lever 24 towards the right side (i.e., towards the side of the 'D' position) is restricted. Furthermore, when the lever 24 is disposed in the 'D' position, rotational movement of the right restricting surface 30, which is an outer side surface in the lateral direction of the lever 24, towards the right side is restricted by the left surface of the right restricting portion 22 of the plate 12, and an operation to move the lever 24 towards the left side (i.e., towards the side of the 'M' position) is restricted.

Because of this, when the left restricting surface 28 of the lever 24 interferes (i.e., comes into surface contact) with the right surface of the left restricting portion 20 of the plate 12, it is sufficient if the right avoidance hole 34 in the lever 24 is able to avoid contacting the right restricting portion 22 of the plate 12. Furthermore, when the right restricting surface 30 of the lever 24 interferes (i.e., comes into surface contact) with the left surface of the right restricting portion 22 of the plate 12, it is sufficient if the left avoidance hole 32 in the lever 24 is able to avoid contacting the left restricting portion 20 of the plate 12. As a result, the right avoidance hole 34 and the left avoidance hole in the lever 24 can be made smaller, so that the strength of the portion where the left restricting surface 28 and the left avoidance hole 32 are formed in the lever 24 and the strength of the portion where the right restricting surface 30 and the right avoidance hole 34 are formed in the lever 24, in other words, the strength of both outer side portions in the lateral direction of the lever 24 can be increased, and both an operation to rotationally move the lever 24 from the 'M' position towards the right side, and an operation to rotationally move the lever 24 from the 'D' position towards the left side can be suitably restricted.

Furthermore, as a result of the restricting frame 16 (including the protruding portion 16A) of the plate 12 restricting the rotational movement of the lower portion 24B of the lever 24, rotational movement of the lever 24 beyond the range of rotational movement is restricted. Because of this, rotational movement of the lever 24 beyond the range of rotational movement can be restricted.

Moreover, when operating force to rotationally move the lever 24 from the 'M' position towards the right side (i.e., towards the 'D' position side) is applied to the lever 24, displacement force in an upward direction is applied from the right surface of the left restricting portion 20 to the left restricting surface 28 of the lever 24, so that displacement force in an upward direction is applied to the lever 24. Furthermore, when operating force to rotationally move the lever 24 from the 'D' position towards the left side (i.e., towards the 'M' position side) is applied to the lever 24, displacement force in an upward direction is applied from the left surface of the right restricting portion 22 to the right restricting surface 30 of the lever 24, so that displacement force in an upward direction is applied to the lever 24.

Figure 3:
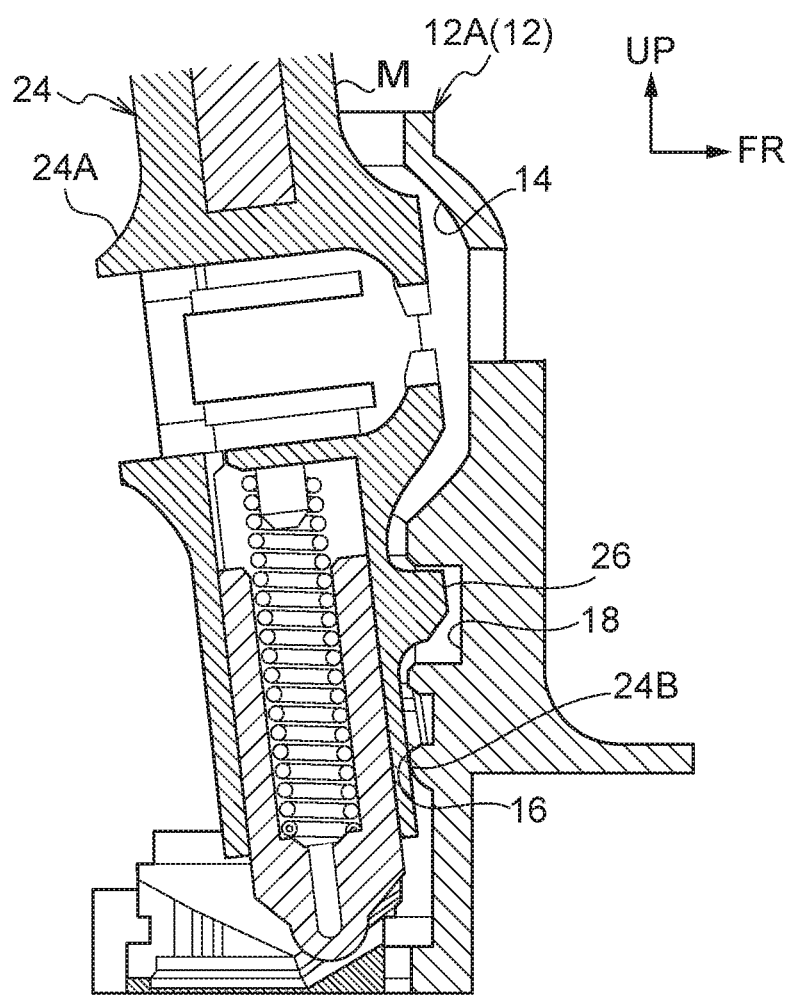
FIG. 3 is a cross-sectional view as seen from the right side showing a state when the lever of the shift device according to an exemplary embodiment of the present invention is placed in an 'M' position.
Figure 4A:
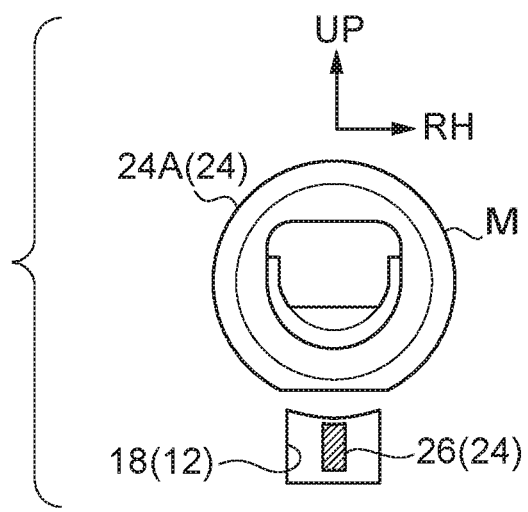
FIG. 4A is a rear surface view showing the placement of a restricting projection and a restricting hole of the shift device according to an exemplary embodiment of the present invention, and shows a state when the lever is placed at the 'M' position.
Figure 4B:
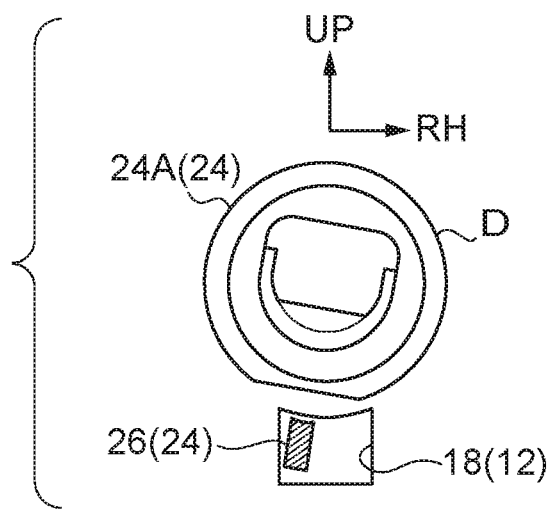
FIG. 4B is a rear surface view showing the placement of the restricting projection and the restricting hole of the shift device according to an exemplary embodiment of the present invention, and shows a state when the lever is placed at the 'D' position.
Figure 5A:
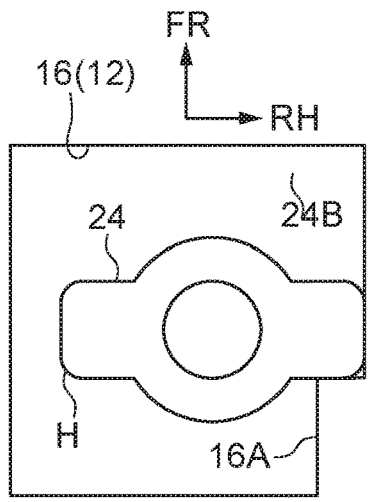
FIG. 5A is a cross-sectional view as seen from above showing a restricting frame and the lever of the shift device according to an exemplary embodiment of the present invention, and shows a state when the lever is placed at an 'H' position.
Figure 5B:
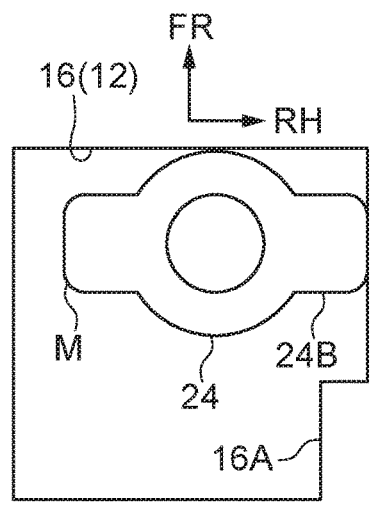
FIG. 5B is a cross-sectional view as seen from above showing the restricting frame and the lever of the shift device according to an exemplary embodiment of the present invention, and shows a state when the lever is placed at the 'M' position.
Figure 5C:
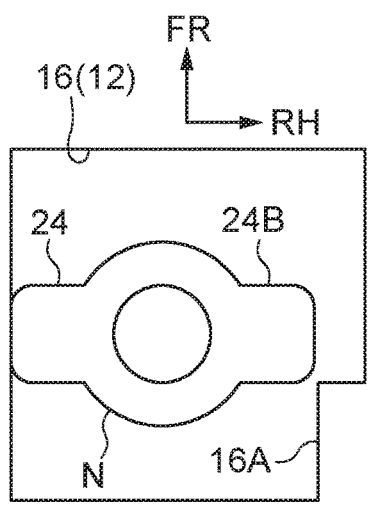
FIG. 5C is a cross-sectional view as seen from above showing the restricting frame and the lever of the shift device according to an exemplary embodiment of the present invention, and shows a state when the lever is placed at an 'N' position.
Figure 5D:
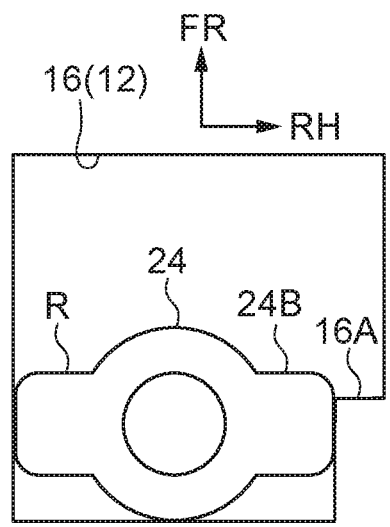
FIG. 5D is a cross-sectional view as seen from above showing the restricting frame and the lever of the shift device according to an exemplary embodiment of the present invention, and shows a state when the lever is placed at an 'R' position.
Figure 5E:
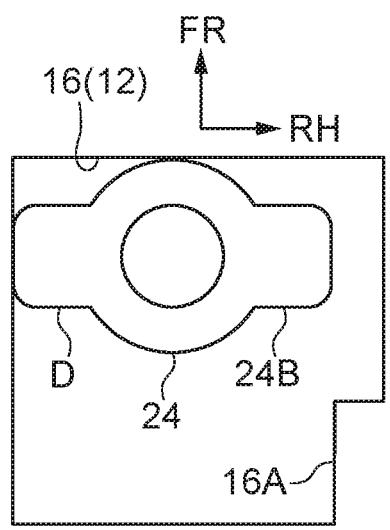
FIG. 5E is a cross-sectional view as seen from above showing the restricting frame and the lever of the shift device according to an exemplary embodiment of the present invention, and shows a state when the lever is placed at the 'D' position.

When the displacement force in an upward direction is applied to the lever 24, displacement towards the upper side of the restricting projection 26 is restricted by the upper surface of the restricting hole 18, so that displacement towards the upper side of the lever 24 is restricted (see FIG. 3, FIG. 4A, and FIG. 4B). Because of this, the lever 24 can be accurately placed at the 'M' position and at the 'D' position, and detection of the placement of the lever 24 at the 'M' position and at the 'D' position can also be accurately performed. Furthermore, when the operating force to rotationally move the lever 24 from the 'M' position towards the right side is applied and the lever 24 is displaced towards the upper side, it is possible to inhibit a separation distance between the center of rotational movement of the lever 24 and the interference position at which the left restricting surface 28 interferes with the left restricting portion 20 from increasing. In addition, when the operating force to rotationally move the lever 24 from the 'D' position towards the left side is applied and the lever 24 is displaced towards the upper side, it is possible to inhibit a separation distance between the center of rotational movement of the lever 24 and the interference position at which the right restricting surface 30 interferes with the right restricting portion 22 from increasing. As a consequence, not only is it possible to inhibit a load (i.e., a torque) that is applied to the left restricting surface 28 and the left restricting portion 20 from increasing when operating force to rotationally move the lever 24 from the 'M' position towards the right side is applied to the lever 24, but it is also possible to inhibit a load (i.e., a torque) that is applied to the right restricting surface 30 and the right restricting portion 22 from increasing when operating force to rotationally move the lever 24 from the 'D' position towards the left side is applied to the lever 24. As a result, any damage to the left restricting surface 28, the left restricting portion 20, the right restricting surface 30, and the right restricting portion 22 can be inhibited. Moreover, it is not necessary to reinforce the left restricting surface 28, the left restricting portion 20, the right restricting surface 30, and the right restricting portion 22 by increasing sizes of these portions or by forming them from metal. It is also not necessary to increase respective distances between the center of rotational movement of the lever 24 and the left restricting surface 28, the left restricting portion 20, the right restricting surface 30, and the right restricting portion 22 in order to decrease the load applied to these portions. As a result, it is possible to inhibit any increase in the size, the weight, or the cost of the shift device 10.

Moreover, the lever 24 has a symmetrical shape with respect to a central face that is perpendicular to the lateral direction at the center thereof in the lateral direction. Because of this, in a case in which the shift device 10 is applied to a left-hand drive vehicle instead of a right-hand drive vehicle so that the shape of the plate 12 is inverted in the lateral direction, the lever 24 can still be used in this plate 12. As a consequence, the lever 24 can be used by both right-hand drive vehicles and left-hand drive vehicles.

Note that, in the present exemplary embodiment, the left restricting surface 28 and the left restricting portion 20 as well as the right restricting surface 30 and the right restricting portion 22 are provided at the lower side of the center of rotational movement of the lever 24. However, it is also possible for at least one of the left restricting surface 28 and left restricting portion 20 or the right restricting surface 30 and right restricting portion 22 to be provided at the upper side of the center of rotational movement of the lever 24.

Moreover, in the present exemplary embodiment, the shift device 10 is a floor-type shift device, and is installed in a floor of a vehicle cabin. However, it is also possible for the shift device 10 to be installed at a console, instrument panel, or steering column of a vehicle cabin.

The invention claimed is:

1. A vehicle shift device, comprising:
a housing;
a shift body comprising an upper end portion being configured to be moved by a vehicle driver in a first direction and in a second direction that intersects the first direction such that a shift position of the shift body is altered, the upper end portion being movable into a first movement position and a second movement position that are aligned in the first direction and not aligned in the second direction; and
a pair of restricting portions that restrict movement of the shift body toward either side in the second direction between the pair of movement positions by restricting movement of outer side surfaces of the shift body in the second direction, wherein:
the upper end portion extends outside of an upper side of the housing,
a first movement path and a second movement path are formed along the first direction within the housing,
a third movement path is formed along the second direction within the housing, and the third movement path connects the first movement path and the second movement path,
a plurality of movement positions, which includes the first movement position and the second movement position are located at the first movement path and the second movement path,
one of the first movement position and the second movement position is located at the first movement path and the other of the first movement position and the second movement position is located at the second movement path, and
the pair of restricting portions are disposed inside the housing and comprise a first restricting surface and a second restricting surface, the first restricting surface being disposed at a first end in the second direction and facing toward a second end in the second direction, the second restricting surface being disposed at the second end in the second direction and facing toward the first end in the second direction, the first restricting surface restricting movement of the shift body toward the second end in the second direction, and the second restricting surface restricting movement of the shift body toward the first end in the second direction.

2. The shift device according to claim 1, further comprising a displacement restricting portion that, in a state in which the shift body is disposed at either one of the first movement position and the second movement position, restricts displacement of the shift body in a perpendicular direction relative to a movement direction of the shift body.

3. The shift device according to claim 2, further comprising an outer restricting portion that restricts movement of the shift body beyond a range of movement of the shift body.

4. The shift device according to claim 1, further comprising an outer restricting portion that restricts movement of the shift body beyond a range of movement of the shift body.

5. The shift device according to claim 1, wherein shapes of the pair of restricting portions are different from each other.

* * * * *